June 24, 1969  L. S. WYSOCKI  3,451,539
CIRCULAR TYPE DISC
Filed Aug. 7, 1968

INVENTOR
LAWRENCE S. WYSOCKI
BY Robert M. Dunning
ATTORNEY

United States Patent Office 3,451,539
Patented June 24, 1969

3,451,539
CIRCULAR TYPE DISC
Lawrence S. Wysocki, Chicago, Ill., assignor to Hoerner Waldorf Corporation, St. Paul, Minn., a corporation of Delaware
Filed Aug. 7, 1968, Ser. No. 750,965
Int. Cl. B65d 85/00, 65/04, 5/54, 17/02
U.S. Cl. 206—46                                    7 Claims

ABSTRACT OF THE DISCLOSURE

Generally cylindrical patties of meat and the like are supported upon a paperboard disc of similar size. A transparent film encloses the patty and the marginal edges of the film are sealed to the exposed surface of the disc. A zig-zag line of perforations extends across the disc. When the patty is bent in a manner to flex the exposed surface of the disc into convex form, the disc will burst apart along the perforations, tending to tear or unseal the edges of the film.

---

This invention relates to an improvement in meat patty package and deals particularly with a package containing a patty of meat or other material which may be easily opened for use.

Meat patty packages have been produced both for human consumption and as a pet food. These packages usually include a generally cylindrical patty of meat which rests upon a disc of coated paperboard. The patty is usually wrapped in a transparent film and the edges of the film are sealed to the under surface of the disc. Due to the shape of the package, the film becomes bulky in thickness where the film is gathered and sealed together, and quite often the packages are extremely hard to open. In view of the fact that the film is usually tough and resistent to tearing, it has often been necessary to either carefully unseal the folds or else to cut the film in order to remove the contents.

I have found that packages of the type in question may be opened very easily if the disc is diametrically perforated so it can be separated into two semi-circular halves. Unfortunately, however, perforating the disc along a straight line does not work satisfactorily as the paperboard discs will not remain flat during the formation and handling of the packages. However, by using angularly related perforations with the perforations arranged 90° apart, or at a 45° angle to a centerline through the perforations, a structure is provided which will stand up during the formation of the package and during the normal handling thereof. When the halves of discs on opposite sides of the angular perforations are flexed, the discs will separate along the perforated lines, and tear the package apart exposing the contents.

It is recognized that I am not the first to provide perforated lines in which the slits are angularly related. However, in the present environment, the particular form of perforations produces a novel action when the discs are bent.

Angular perforations of the type described arranged in a zig-zag pattern result in alternately directed triangular projections with the apex of each projection on one side of the perforations connected to the portion of the disc on the opposite side of the perforations. When opposite sides of the disc are bent along the perforations, the apex of each triangular projection tends to swing upwardly while the base of each projection tends to move downwardly. As a result, the nicks between the perforations are readily torn and the disc splits apart, tending to also tear the edges of the film connected thereto.

A further feature of the present invention resides in the provision of a package of the type described in which light crease lines or shallow cut score lines may extend along one or both sides of the perforated line to insure the accurate tearing of the paperboard along the perforated lines. When the patty is grasped and bent along the perforated line, the paperboard first folds along the bar score line or lines or along the cut score line or lines, this folding acting to reinforce the paperboard on one or both sides of the perforated line. As a result, by pressing with the fingers while the package is being held, the disc will first bend along the score line adjoining the perforated line and then will burst apart at the perforated line, splitting the disc and film attached thereto. In actual practice, the packages may be opened readily with one hand. By contrast, the same package having the paperboard disc which is imperforate is extremely difficult to open and will not open in a uniform manner but will come apart wherever the seal is weakest. Furthermore, if a straight line of perforations is provided in place of the angle perforations mentioned, the disc will not burst apart in the manner of the present construction and the package will not open consistently.

These and other objects and novel features of the present invention will be more clearly and fully set forth in the following specification and claims.

On the drawings forming part of the specification.

Figure 1:
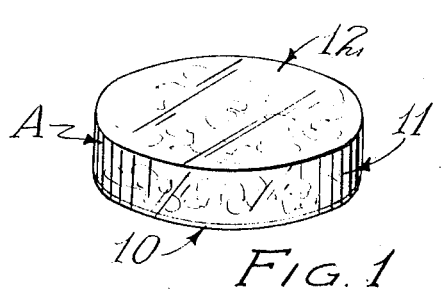
FIGURE 1 is a perspective view of the package in its sealed condition.
Figure 3:
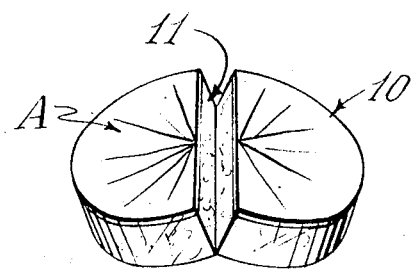
FIGURE 3 is a perspective view of the package after the disc has been split apart.
Figure 2:
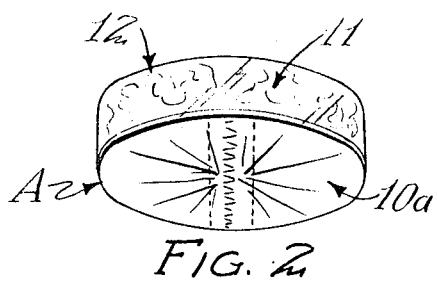
FIGURE 2 is a bottom perspective view of the package shown in FIGURE 1.

In general, the package A comprises a paperboard disc which is indicated in general by numeral 10, a generally cylindrical disc 11 of meat or similar product, and the covering film which is indicated in general by the numeral 12. Normally the patty of meat or other product is placed upon the disc 10 and the package is directed to an overwrapping machine which folds the edges of a sheet of film overlying the patty downwardly along the sides of the patty and is then gathered inwardly beneath the disc and is marginally sealed thereto. The disc is usually coated with a surface to which the film will adhere. Inward folding of the film beneath the disc causes the film to gather in folds along the bottom of the disc as indicated in the drawings. When the film is effectively sealed, considerable time and effort is required to pull the film from the disc and unfold it, and it is usually easier with a structure of this type to cut the film with a knife in order to remove the contents.

The first efforts to provide an easy opening disc structure were made by providing a line of perforations across the disc extending diametrically thereof. However, while paperboard may be readily torn along a line of perforations by pressing the paperboard on one side of the perforations out of the plane of the paperboard on the other side of the perforations, considerable effort is required to pull the two sides of the disc apart. The product itself resisted the pressing of one side of the disc inwardly relative to the other. After considerable experimentation it was decided to adopt the type of perforations illustrated in the drawings. In this arrangement, each of the perforations is a cut line which extends at substantially 45° to a diametrically extending line through the centers of the cuts. The cut lines preferably extend completely through the paperboard and the adjacent ends of each pair of cut lines are spaced apart a distance which is indicated by the letter X in the FIGURE 9 of the drawings. As a specific example, the cut lines 13 which are parallel and cross the center line in one direction are about 3/16 of an inch in length, and the perforations or cut lines 14 which are parallel and cross the center line in the opposite direction are of the same length. The disc 10 is 2 3/4 inches in diameter, and the paperboard is of .014 caliper. The distance between the ends of the perforations 13 and 14 is about .014 inch or approximately 1/64 of an inch. The weakened line is thus zig-zag in pattern.

Figure 4:
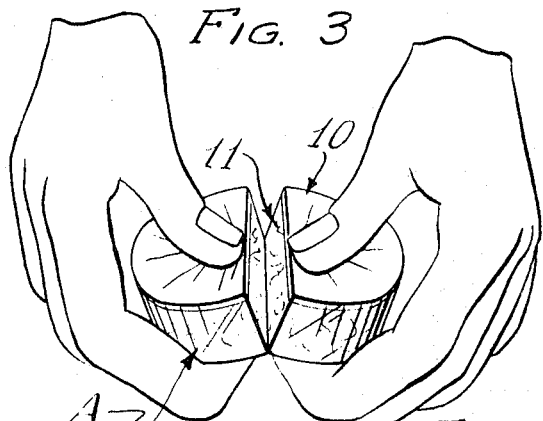
FIGURE 4 is a perspective view showing one manner in which the package may be opened.
Figure 5:
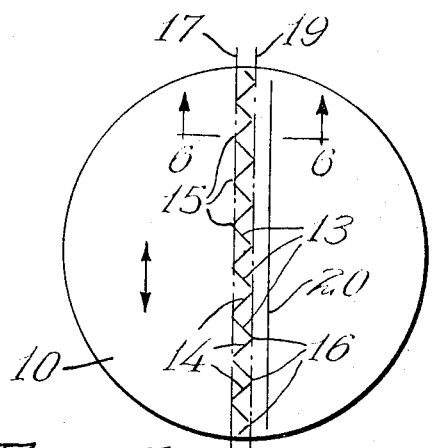
FIGURE 5 is a plan view of a disc showing one form of construction.
Figure 6:
FIGURE 6 is an enlarged sectional view, the position of the section being indicated by line 6—6 of FIGURE 5.
Figure 8:
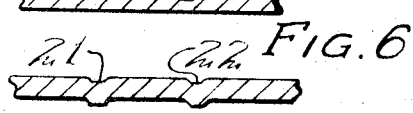
FIGURE 8 is an enlarged sectional view, the position of the section being indicated by the line 8—8 of FIGURE 7.

It has been found that when the package A is formed with this type of disc, the disc will readily split apart. One way to do this is as follows: package is inverted, the fingers of the hand are inserted beneath the film covering the patty, and the thumbs are placed on opposite sides of the line of perforations. The package is then bent along the line of perforations. The position of the hands in opening the package is diagrammatically illustrated in FIGURE 4 of the drawings. The bending action causes a tendency for the disc to separate along a line 17 through nicks 15 to the left of the center line of the perforations and also to separate along the broken line 19 through the nicks 16 which are on the right side of the center line. This action causes the paperboard to break off at these points, rather than to merely bend. In other words, the pointed areas on each side of the line of perforation are readily separated due to the offset lines of connection. The point of each triangular projection tends to raise while the base of each projection tends to lower. As a result, the disc will burst apart along the center, this action tends to tear the edges of the film which are aligned with the perforations, or at least to separate the folds in this area. FIGURE 5 of the drawings shows a first modified form of construction which includes a cut score line 20 extending parallel to the center line of the perforations and, in the arrangements illustrated, is located about an eighth of an inch from the nicks 16. This cut score line preferably extends only about twenty to thirty percent of the thickness of the paperboard. When bending pressure is applied to the patty, as indicated in FIGURE 4 of the drawings, the disc 10 tends to fold slightly along the line 20, reinforcing the area adjoining the perforations and also preventing the disc from splitting along an erratic line. In other words, the cut score line 20 limits any erratic tearing.

The cut score line 20 may also comprise a bar crease. For the purpose of illustration, the disk 10a illustrated in FIGURE 7 of the drawings shows a pair of bar creases on opposite sides of the perforations 13 and 14 along which the disc may fold to some degree. In action, when pressure is applied to the disc in the manner illustrated in FIGURE 4, the disc tends to bend slightly along the fold lines 21 and 22 so that the exposed surface of the disc is somewhat convex. Additional pressure causes the intermediate area between the fold lines 21 and 22 to suddenly burst apart to separate both the disc and the film along the center line.

Figure 7:
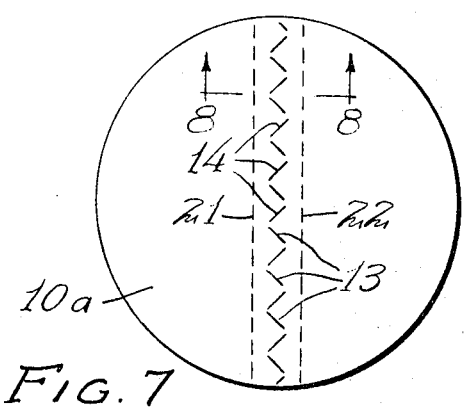
FIGURE 7 is a plan view of a modified form of disc.

In the interest of simplicity, I have shown one structure in FIGURE 5 which includes a single cut score line 20, and a second structure in FIGURE 7 which shows two parallel spaced bar creases. It should be understood that a crease line could be substituted for a cut score line 20, or that cut score lines could be substituted for the bar creases 21 and 22. Both the fold lines and the bar creases serve much the same purpose.

Figure 9:
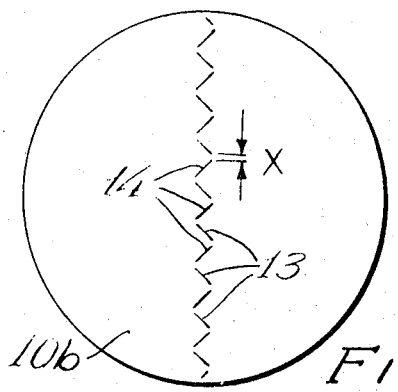
FIGURE 9 is a plan view of another modified form of a disc.

FIGURE 9 of the drawings shows another modified form of construction 10b which actually is the simplest form of construction and eliminate the cut score lines or crease lines 20 and 21 and 22. This structure also functions effectively, although the disc does not appear to snap open with such force as with the previous constructions described. This may possibly be due to the fact that with the structures 10 and 10a, the disc first tends to flex along the score lines or cut score lines, reinforcing a portion of the area adjoining the perforation. As a result, there may be more pressure on the disc when the perforations separate, and more of a bursting effect is created which tends to split the film more effectively.

In accordance with the patent statutes, I have described the principles of construction and operation of my meat patty package; and while I have endeavored to set forth the best embodiment thereof, I desire to have it understood that obvious changes may be made within the following claims without departing from the spirit of my invention.

I claim:
1. A package comprising:
   a generally cylindrical patty of product,
   a paperboard disc at one end of said cylindrical patty,
   a film extending over the other end of said patty and about the peripheral walls thereof, the marginal edges of said film being sealed to said paperboard disc, and
   said disc having a weakened line of separation extending across it, said weakened line including perforations arranged in a zig-zag pattern, whereby when said package is flexed in a manner to bend the exposed surface of the disc into convex form, said disc will burst apart along said weakened line.

2. The structure of claim 1 and in which the disc includes a crease line extending along one side of said weakened line of separation and substantially parallel thereto.

3. The structure of claim 2 and in which said crease line is a bar crease.

4. The structure of claim 2 and in which said crease line is a cut crease.

5. The structure of claim 1 and in which the disc includes a pair of parallel crease lines on opposite sides of said weakened line of separation.

6. The structure of claim 5 and in which said crease lines are bar creases.

7. The structure of claim 5 and in which said crease lines comprise cut creases.

References Cited
UNITED STATES PATENTS 3,207,299   9/1965   Sparks _____ 206—42
3,261,538   7/1966   Jones et al.

JAMES B. MARBERT, *Primary Examiner.*

U.S. Cl. X.R.
229—87